United States Patent [19]
Johnson et al.

[11] Patent Number: 5,175,851
[45] Date of Patent: Dec. 29, 1992

[54] SYSTEM AND METHOD FOR CONTROLLING CLIENT MACHINE ACCESS TO A PORTION OF A FILE WITH A VARIABLE LENGTH

[75] Inventors: Donavon W. Johnson, Georgetown, Tex.; Stephen P. Morgan, Mahopac, N.Y.; Todd A. Smith, Austin, Tex.

[73] Assignee: International Business Machines Corporation, Armonk, N.Y.

[21] Appl. No.: 352,084

[22] Filed: May 15, 1989

[51] Int. Cl.⁵ .................... G06F 9/06; G06F 13/14; G06F 12/14; G06F 15/40
[52] U.S. Cl. .................... 395/600; 364/229; 364/229.5; 364/252.2; 364/286; 364/280; 364/280.6; 364/282.4; 364/284.4; 364/286.5; 364/DIG. 1
[58] Field of Search .............. 364/200, 900; 395/400, 395/425, 725, 800, 275, 200, 600

[56] References Cited

U.S. PATENT DOCUMENTS

| | | | |
|---|---|---|---|
| 4,104,718 | 8/1978 | Poublan et al. | 364/200 |
| 4,724,521 | 1/1988 | Carron et al. | 364/200 |
| 4,819,159 | 4/1989 | Shipley et al. | 364/200 |
| 4,855,906 | 8/1989 | Burke | 364/200 |
| 4,887,204 | 12/1989 | Johnson et al. | 364/200 |
| 4,914,569 | 4/1990 | Leune et al. | 364/200 |
| 4,961,133 | 10/1990 | Talati et al. | 364/200 |
| 5,046,002 | 9/1991 | Takashi et al. | 364/200 |

FOREIGN PATENT DOCUMENTS 0278315 8/1988 European Pat. Off. .

OTHER PUBLICATIONS

S. R. Kleiman, "Vnodes: An Architecture for Multiple File System Types in Sun UNIX", Conference Proceedings, USENIX 1986.
Summer Technical Conference and Exhibition, pp. 238-247.
Russel Sandberg et al., "Design and Implementation of the Sun Network Filesystem" Conference Proceedings, USENIX 1985, pp. 119 to 130.
Dan Walsh et al., "Overview of the Sun Network File System", pp. 117 to 124.
JoMei Chang, "Status Monitor Provides Network Locking Service for NFS".
JoMei Chang, "SunNet", pp. 71-75.
Bradley Taylor, "Secure Networking in the Sun Environment" pp. 28 to 36.

(List continued on next page.)

*Primary Examiner*—Lawrence E. Anderson
*Assistant Examiner*—Daniel H. Pan
*Attorney, Agent, or Firm*—Douglas H. Lefeve

[57] ABSTRACT

A system and method in which client access to data at a server is synchronized to keep the data consistent by ensuring that each portion of the data accessible for modification at a node is not accessible for reading or modification by any other node, while allowing portions of the data accessible only for reading to be accessible by any number of nodes. If a conflicting request arises from a different client the server must revoke data that has been previously distributed to a client. For a revokes_bytes request, all outstanding get_bytes are marked so that the bytes that are being requested to be revoked will be discarded when they do arrive at the client. To insure that read and write system calls on a file are performed in a serializable fashion throughout a distributed environment, each machine at which a read is being performed must acquire a read token and each machine at which a write is being performed must acquire a read/write token from the server for the file. When any machine has a read/write token, no machine is allowed to have a read token, although any number of machines may have a read token at the same time. The server coordinates the distribution of these tokens by revoking all read tokens whenever a write token is requested and revoking the write token whenever any read token is requested.

15 Claims, 12 Drawing Sheets

OTHER PUBLICATIONS

Andrew P. Rifkin et al., "RFS Architectural Overview", USENIX Conference Proceedings, Atlanta, Ga. (Jun. 1986), pp. 1 to 12.

Richard Hamilton et al., "An Administrator's View of Remote File Sharing", pp. 1 to 9.

Tom Houghton et al., "File Systems Switch", pp. 1 to 2.

David J. Olander et al., "A Framework for Networking in System V", pp. 1 to 8.

G. J. Popek and B. J. Walker: "The Locus Distributed System Architecture," 1985, The MIT Press Series in Computer Systems (US) p. 29-appendix B, p. 138; chapter 3, p. 48, line 17 through p. 57, line 23; appendix B, p. 131, lines 10-24.

ACM Transactions on Computer Systems, vol. 6, No. 1, Feb. 1988, N.Y., US, pp. 134-154; M. N. Nelson et al: "Caching in the Sprite Network File System".

ACM Transaction on Computer Systems, vol. 6, No. 1, Feb. 1988, N.Y., US, pp. 51-81: J. H. Howard et al: "Scale and Performance in a Distributed File System."

IBM TDB, vol. 31, No. 8, Jan. 1989, N.Y., US; pp. 195-198; "Method for Managing Clinet/Server Relationships in the AIX Operating System," p. 195, line 1-p. 197, line 24.

REQUEST

REPLY

| OP CODE | RETURN CODE | LENGTH | DATA |
|---|---|---|---|
| | | 446 | 447 |

REQUEST

REPLY

REVOKE_TKN  480

REQUEST

| OP CODE | RESIDUAL TOKEN TYPE |
|---|---|
|  |  |

481

REPLY

| OP CODE | RETURN CODE | FILE SIZE | MODIFY COUNT | ACCESS COUNT |
|---|---|---|---|---|
|  |  |  |  |  |

482

SYSTEM AND METHOD FOR CONTROLLING CLIENT MACHINE ACCESS TO A PORTION OF A FILE WITH A VARIABLE LENGTH

CROSS-REFERENCE TO RELATED APPLICATIONS

U.S. Pat. No. 4,887,204 of D. W. Johnson et al, filed Feb. 13, 1987, entitled "A System And Method for Accessing Remote Files In A Distributed Networking Environment", herein incorporated by reference.

Application Ser. No. 07/352,090, now U.S. Pat. No. 5,113,519, of D. W. Johnson et al, filed May 15, 1989, entitled "Maintenance Of File Attributes In A Distributed Data Processing System", herein incorporated by reference.

Application Ser. No. 07/352,220, now abandoned, (continuation Ser. No. 07/739,799, now abandoned, filed Aug. 1, 1991), of S. P. Morgan et al, filed May 15, 1989, entitled "File Extension By Clients In A Distributed Data Processing System", herein incorporated by reference.

Application Ser. No. 07/352,075 of D. W. Johnson et al. filed May 15, 1989, entitled "Remote Authentication And Authorization In A Distributed Data Processing System", herein incorporated by reference.

Application Ser. No. 07/352,518, now abandoned, of L. K. Loucks et al, filed May 15, 1989, entitled "A Flexible Interface To Authentication Services In A Distributed Data Processing System", herein incorporated by reference.

Application Ser. No. 07/352,080, now abandoned, of D. W. Johnson et al, filed May 15, 1989, entitled "File Lock Management in a Distributed Data Processing System", herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to processing systems connected through a network, and more particularly to the accessing of files between local and remote processing systems within the network.

BACKGROUND ART

As shown in FIG. 1, a distributed networking environment 1 consists of two or more nodes A, B, C, connected through a communication link or a network 3. The network 3 can be either a local area network (LAN), or a wide area network (WAN).

At any of the nodes A, B, C, there may be a processing system 10A, 10B, 10C, such as a workstation. Each of these processing systems 10A, 10B, 10C, may be a single user system or a multi-user system with the ability to use the network 3 to access files located at a remote node. For example, the processing system 10A at local node A is able to access the files 5B and 5C at the remote nodes B and C, respectively.

Within this document, the term "server" will be used to indicate the processing system where the file is permanently stored, and the term "client" will be used to mean any other processing system having processes accessing the file. It is to be understood, however, that the term "server" does not mean a dedicated server as that term is used in some local area network systems. The distributed services system in which the invention is implemented is truly a distributed system supporting a wide variety of applications running at different nodes in the system which may access files located anywhere in the system.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system are known. For example, IBM's Distributed Services for the AIX operating system is disclosed in U.S. Pat. No. 4,887,204 "A System and Method for Accessing Remote Files in a Distributed Networking Environment ", filed Feb. 13, 1987 in the name of Johnson et al. In addition, Sun Microsystems has released a Network File System (NFS) and Bell Laboratories has developed a Remote File System (RFS). The Sun Microsystems NFS has been described in a series of publications including S.R. Kleiman, "Vnodes: An Architecture for Multiple File System Types in Sun UNIX", *Conference Proceedings, USENIX 1986 Summer Technical Conference and Exhibition*, pp. 238 to 247; Russel Sandberg et al., "Design and Implementation of the Sun Network Filesystem", *Conference Proceedings, Usenix 1985*, pp. 119 to 130; Dan Walsh et al., "Overview of the Sun Network File System", pp. 117 to 124; JoMei Chang, "Status Monitor Provides Network Locking Service for NFS", JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless server. This means that the server does not store any information about client nodes, including such information as which client nodes have a server file open or whether client processes have a file open in read—only or read—write modes. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "stateful implementation". A "stateful" server, such as that described here, does keep information about who is using its files and how the files are being used. This requires that the server have some way to detect the loss of contact with a client so that accumulated state information about that client can be discarded. The cache management strategies described here cannot be implemented unless the server keeps such state information.

The problems encountered in accessing data at remote nodes can be better understood by first examining how a stand-alone system accesses files. In a stand alone system, such as 10 as shown in FIG. 2, a local buffer 12 in the operating system 11 is used to buffer the data transferred between the permanent storage 2, such as a hard file or a disk in a workstation, and the user address space 14. The local buffer 12 in the operating system 11 is also referred to as a local cache or kernel buffer.

In the stand-alone system, the kernel buffer 12 is divided into blocks 15 which are identified by device number, and logical block number within the device. When a read system call 16 is issued, it is issued with a file descriptor of the file 5 for a byte range within the file 5, as shown in step 101, FIG. 3. The operating system 11 takes this information and converts it to device number, and logical block numbers in the device, step 102, FIG. 3. If the block is in the cache, step 103, the data is obtained directly from the cache, step 105. At step 103, in the case in which the cache does not already contain the block that is sought, the data is read into the cache in step 104 before proceeding with step 105 where the data is obtained from the cache.

Any data read from the disk 2 is kept in the cache block 15 until the cache block 15 is needed for some other purpose. Consequently, any successive read requests from an application 4 that is running on the processing system 10 for the same data previously read is accessed from the cache 12 and not the disk 2. Reading from the cache is far less time consuming than reading from the disk.

Similarly, data written from the application 4 is not saved immediately on the disk 2, but is written to the cache 12. This saves disk accesses if another write operation is issued to the same block. Modified data blocks in the cache 12 are saved on the disk 2 periodically.

Use of a cache in a stand-alone system that utilizes an AIX operating system improves the overall performance of the system since disk accessing is eliminated for successive reads and writes. Overall performance is enhanced because accessing permanent storage is slower and more expensive than accessing a cache.

As described above, local buffers in the operating system can be used to improve the performance of stand-alone access to files. These local buffers are kept in fast memory while files are usually kept in slower permanent storage such as disk drives. Larger buffer caches can enhance a data processing system's performance because the cache can hold more of the data belonging to the system's files and hence will reduce the need to use the slower disk drives. A system's fast, physical memory is of limited size. Rather than partitioning physical memory by setting aside a fixed fraction for the operating system's kernel buffers, virtual memory techniques can be used to speed up the access to system's disk files. In this virtual memory technique, there is no fixed cache of disk blocks. Instead, data is cached in virtual not physical memory.

Virtual memory provides memory space larger than the available physical memory. This virtual memory space is divided into pages and used by programs as if the virtual memory space was true physical memory. A system's virtual memory pages reside in either actual physical memory frames, disk blocks, or both. Whenever a virtual memory page is not present in a physical frame, any attempt to use that page will result in an exception known as a page fault. The program attempting to use such a page generates a page fault and is temporarily suspended while the virtual memory page is retrieved from the disk block where it currently resides and is copied into a physical memory frame. After the virtual memory page has been assigned a physical frame, the original faulting program can be allowed to continue and it will now find that the data in that virtual memory page is available.

In the AIX operating system, programs can access the contents of files through system calls such as read or write or directly through mapped access. With mapped access a file is mapped into a portion of the program's virtual address space, causing each load or store to that portion of the program's address space to be reflected as an access to the file. Mapped access to a file has the advantage of allowing direct manipulation of the file or the file contents simply by addressing the bytes to be accessed or modified directly. However, in the case in which multiple programs have the file open and mapped at the same time, the coordination of access to the file has to be performed by the programs themselves. That is, one program may attempt to write a series of ten bytes to the file by simply storing the ten bytes sequentially while the other program is attempting to read these bytes by simply loading from the bytes sequentially. It is possible that the second program will be scheduled to execute before the first program is finished and will see only half of the modified data in the data that it loads from the file. These problems are solved by cooperation between the programs sharing the file or by avoiding the use of mapped files and confining the operation to the use of the read and write system calls. The read system call and write system call in AIX are designed to operate in a serializable fashion, that is, if both are attempted at the same time by two programs, one executes completely before the other is allowed to execute.

In a distributed environment, processes running on one machine may be accessing files on another machine. It is important under these circumstances to insure that read and write operations to a file are performed in a serializable fashion just as they are in a standalone environment where all processes are running on a single machine. The difficulty occurs because performance needs dictate that files be allowed to be cached or buffered on client machines.

In a distributed environment, as shown in FIG. 1, there are two ways the processing system 10C in local node C could read the file 5A from node A. In one way, the processing system 10C could copy the whole file 5A, and then read it as if it were a local file 5C residing at node C. Reading a file in this way creates a problem if another processing system 10A at another node A modifies the file 5A after the file 5A has been copied at node C as file 5C. The processing system 10C would not have access to these latest modifications to the file 5A.

Another way for processing system 10C to access a file 5A at node A is to read one block, e.g. N1 at a time as the processing system at node C requires it. A problem with this method is that every read has to go across the network communication link 3 to the node A where the file resides. Sending the data for every successive read is time consuming.

Thus, accessing files across a network presents the two competing problems illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated data that has just been written. As such, the file integrity is lost since a node may be accessing incorrect and outdated files.

Summarizing, in a distributed data processing system, data can be accessed by a plurality of nodes. The data may be controlled by one node within this data processing system known as the server. The other nodes that access this data are known as the clients. Clients gain access to the data by sending a request to the server. The server returns data to the clients that requested access to the data. The client may then read and additionally, in some instances, modify the requested data. It would, therefore, be of great benefit to the users of such systems for a server to be able to provide identical data to multiple users, while being able to assure each user that the data being processed by that user remains valid, reflecting the latest changes made by all users.

SUMMARY OF THE INVENTION

Accordingly, when multiple clients have an interest in the data, the server node must synchronize access to the data to keep it consistent. The server node does this by ensuring that at any given time, each portion of the data accessible for modification at a node is not accessible for reading or modification by any other nodes while allowing portions of the data accessible only for reading to be accessible by any number of nodes.

To enforce these requirements, the server must revoke data that has been previously distributed to a client, if a conflicting request arises from a different client. For example, in response to one client's requesting read access to a portion of the data, the server will grant that access by distributing a copy of the data to that client. Subsequently, if a second client requests read access to the same portion of the data, the server can similarly distribute that data to the second client. In this way, the second client is allowed read access to the data in the same way that the first client has read access. However, if a third client requests write access to the data, the server must revoke the data that has been distributed to the first and second clients before the server grants the third client's request. The server, thereby, temporarily suspends the first and second clients' ability to read the data, while the third client has the possibility of modifying the data. A server can neither grant, nor continue to allow, read access to a portion of the data to any client (other than the third client) again until the write access to that portion of data from the third client is revoked or withdrawn.

Blocks of data are moved or managed on the basis of "get_bytes", "put bytes" and "revoke_bytes" requests. A deadlock situation could occur when a first client issues a get_bytes request such that the server must send a revoke_bytes request to a second client, and in the meantime the second client has also issued a get_bytes request for the same range of bytes. The second client cannot get the bytes from the server since the server is in the middle of servicing the first client's request for the bytes. However, the server cannot complete the first client's request until the bytes in the second client are revoked. The deadlock will occur if the second client attempts to wait to get the bytes before they are revoked.

To ensure correct operation of revoking bytes without a deadlock situation, the processing of a revoke_bytes request at a client does not wait for the outstanding get_bytes request to complete. Instead, all outstanding get_bytes are marked so that the bytes that are being requested to be revoked will be discarded when they do arrive at the client.

In order to insure that read and write system calls on a file are performed in a serializable fashion throughout a distributed environment, each machine at which a read is being performed must acquire a read token and each machine at which a write is being performed must acquire a read/write token only from the server for the file. If any machine has a read/write token, no machine is allowed to have a read token. Any number of machines may have a read token at the same time. The server coordinates the distribution of these tokens by revoking all read tokens whenever a write token is requested and revoking the write token whenever any read token is requested.

The foregoing and other objects, features, extensions, and advantages of the invention will be apparent from the following more particular description of preferred embodiments of the invention as illustrated in the accompanying drawings.

DESCRIPTION OF THE PREFERRED EMBODIMENTS

Figure 1:
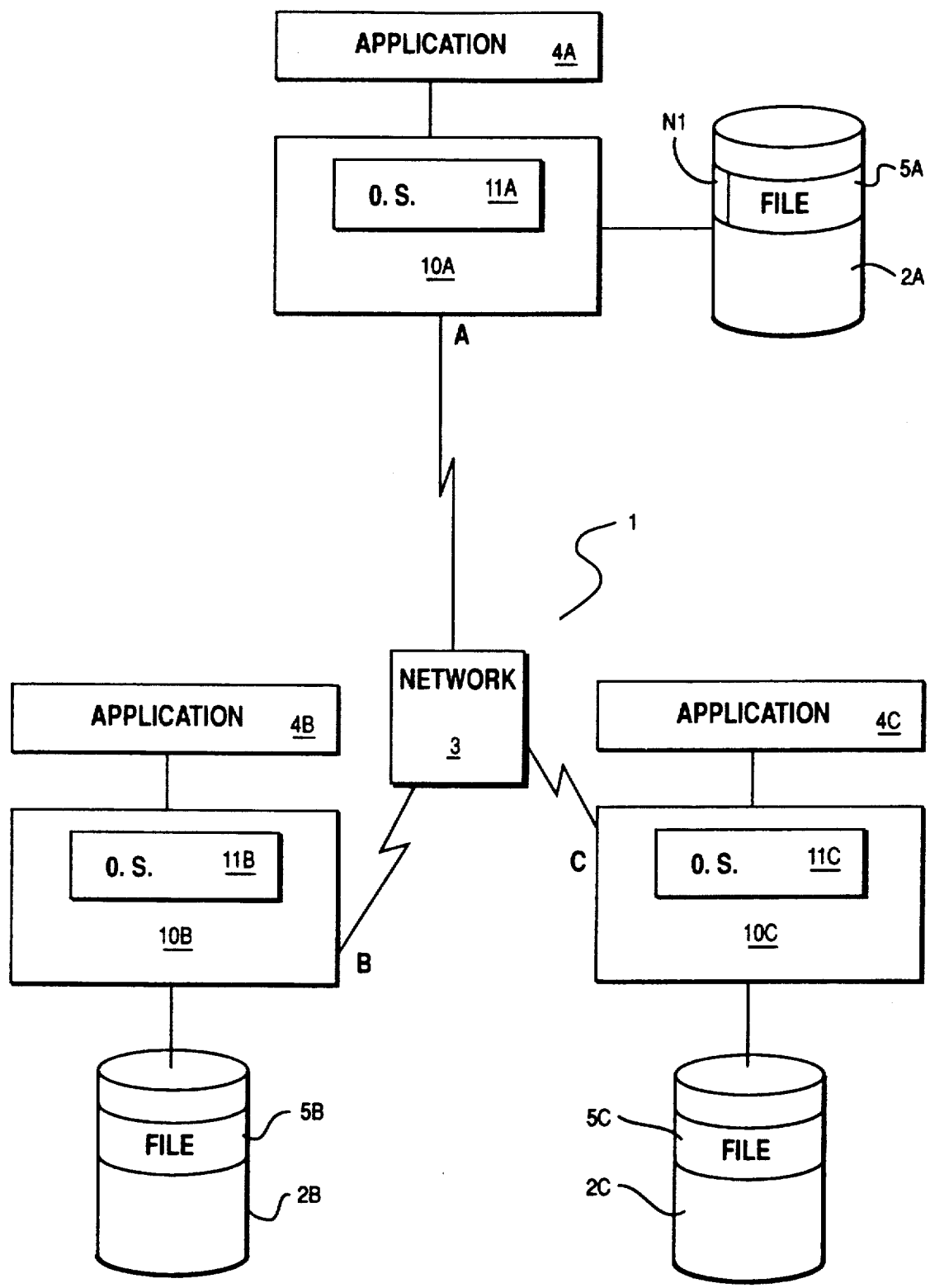
FIG. 1 is a block diagram of a prior art distributed data processing system.
Figure 2:
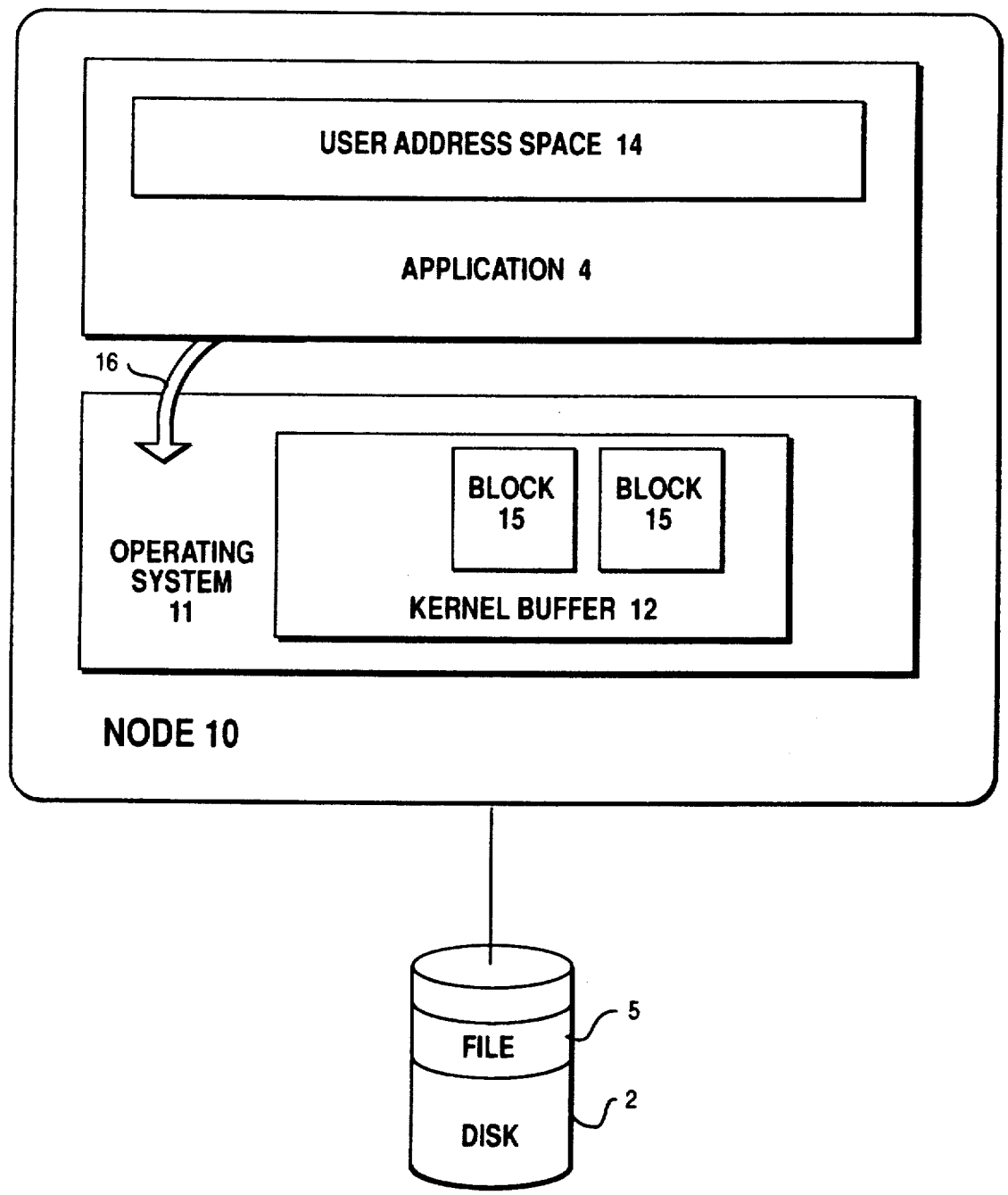
FIG. 2 is a block diagram showing a prior art stand-alone processing system for accessing a file through system calls.
Figure 3:
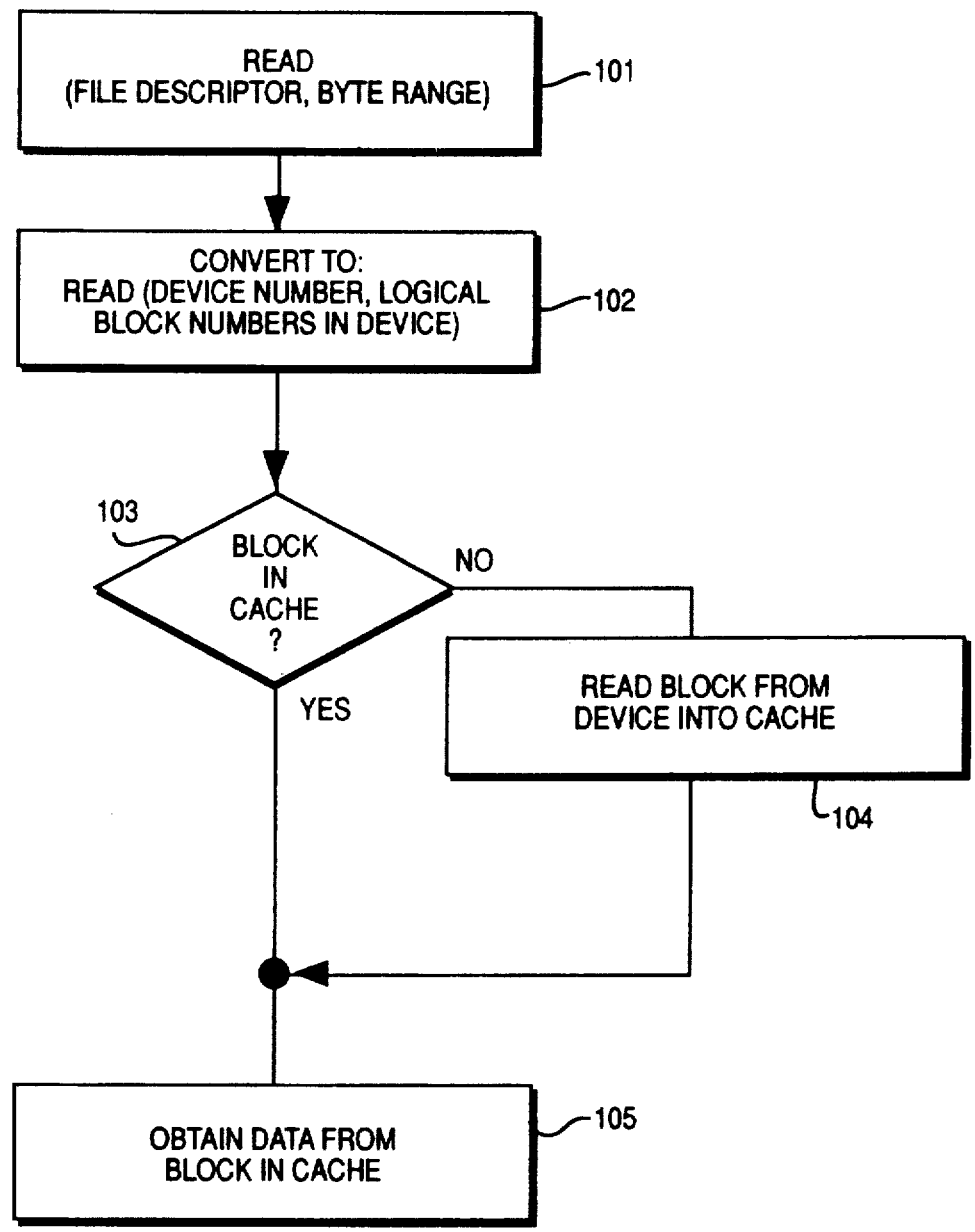
FIG. 3 is a flow diagram of the prior art data processing system of FIG. 2 accessing a file through a system call.

Referring now to FIG. 1, in a distributed networking environment, there exists a plurality of nodes 10A, 10B, 10C that have access to shared data. This invention governs the access to files 5A, 5B, 5C by a plurality a nodes in this distributed data processing system. The file is physically stored at a node called the server. The server is the processing system that has the long term storage of the file. Other nodes attached to the server by means of a communications network 3 can also have access to this file. These nodes are known as clients under these circumstances. Any node can be a server for some files, and be a client for other files. A node can act in both capacities at the same time; accessing remote files as clients while providing service to other nodes as servers.

The actions of a node as a client and the actions of the node as a server are independent from each other. Therefore, these two actions will be described separately, even though it is possible for these two actions to be happening concurrently.

When a client wishes to access data in a file, the client sends a request known as a get_bytes request or message to the file's server. A get_bytes request specifies, in addition to other items, the range of bytes that this client is interested in accessing. The get_bytes request is sent from the client to the server. The server replies, when ready, to the get_bytes request by sending back the data in that range to the requesting client. This get_bytes reply enables the clients to have access to this data.

In the cases where a get_bytes request arrives at a server after other get_bytes requests which that server has satisfied previously, it may be necessary for the server to revoke_bytes that have been previously sent to other clients.

Bytes are revoked with a revoke_bytes message. Revoke bytes messages are sent from servers to client machines. Clients are obligated to respond to a revoke_bytes request by sending back any changed data in the range of bytes that is being revoked. The client is also obligated to discard any data that has not changed within that range.

Clients send modified data back to the server with the put_bytes message. This message, like the get_bytes message and the revoke_bytes message, has a reply that the receiver sends back to the sender. The reply, in all three cases, informs the sender that the intended receiver has received the message and acted on it. Note that data actually moves from the server to the client in the reply to the get_bytes request, and from the client to the server in the put_bytes message.

A situation in which a server must issue a revoke_bytes request occurs when a get_bytes request arrives at a server from a client that wishes to have write access to this range of bytes. The server must revoke all bytes within this range that have been previously sent to clients and not subsequently revoked. Each time that a client issues a get_bytes request, the server keeps a record of the get_bytes reply that the server has issued to that client. In this way, servers can keep track of all copies of the data belonging to a file that has been sent out to client nodes. When a get_bytes request arrives from a client that is requesting these bytes for writing, the server examines its records to ensure that no other clients currently have those same bytes checked out for either reading or writing. If other clients do have those bytes checked out, the server first revokes them by sending a revokes_bytes message to each of these clients having the bytes checked out. These clients send the bytes back to the server with the put_bytes message in the case where the bytes may have been modified and the clients discard the bytes in the case where the bytes have not been modified. However, in all cases, after the bytes have been revoked, the clients do not have access to those bytes. After receiving the put_bytes reply, the client has been informed that the returned data has been received by the server, and the client replies to the revoke_bytes request.

When the server receives the revoke_bytes reply (after receiving any put_bytes messages triggered by the revoke), the server is now free to respond to the get_bytes request for writing by sending the bytes to the requesting client in the get_bytes reply, giving that client permission to modify those bytes. In this way, data within a file is modified at only one place. If the data is being modified, no other clients have access to that range of data. This ensures that by the time the clients do gain access to the data again, the clients will view the data resulting from all subsequent write operations. This gives the effect of serialized access to the data.

To continue with the above example, a client C may express an interest in having read access to bytes that include or overlap the range of bytes that have been given out to a client X. When client C sends a get_bytes request to the server for reading, the server examines its records, and determines that client X has these bytes checked out for writing. The server then must revoke the bytes from client X before the bytes can be sent to client C in a get_bytes reply. While client C is still waiting for the reply from its get_bytes request, the server issues a revoke to client X. As soon as client X is able to, client X sends the bytes that it has modified. When client X has completed sending the bytes back to the server, client X informs the server that all modified bytes within the revoke range have been sent back and that all bytes in the revoke range have been discarded by X (client X informs the server by sending back the reply to the revoke). . The server can now determine from the server's records, that all bytes in the range of requested bytes from C are now up to date and available at the server, and available for sending in a get_bytes reply to client C. During this time, client C has been waiting for the reply to its get_bytes request.

The important rule is that for any byte within the file, only one machine can have that byte for writing, while any number of machines are allowed to have the byte checked out for reading. In the preferred embodiment, the bytes are not tracked on an individual basis. Instead, ranges of bytes are tracked that have been requested by clients. In the preferred embodiment it is ensured that for any range of bytes only one client can have access to the range of bytes for write access.

This invention has several advantages. First, the cost of synchronizing concurrent access to the file occurs only when there actually is concurrent access. In previous methods, the cost of synchronizing concurrent access occurred when a process opened a file with the possibility of modifying the data, even though the process may never actually modify the data.

Another important advantage of this invention is that the range of bytes is cached at each client before and after it is used. This allows more efficient use of the data under most circumstances. For example, in the case of mapped access to files, a mapping operation is performed which maps a file into a process' address space. Once this mapping is accomplished, the contents of the file are accessible as if the contents were located in normal memory. This mapping operation is supported by virtual memory management and is an efficient way to access files.

The system and method of this invention controls how the revoking of bytes is handled. It is desirable to minimize the number of messages sent back and forth between the server and the clients. It is also desirable to eliminate the possibility of a deadlock situation where each node is waiting for another node to make some progress and none of the nodes result in making any progress. It is also desirable to minimize the possibility that a node believes that it has been granted access to a range of bytes while the server believes that those bytes have been revoked.

The invention is illustrated in the following scenario. With reference to the prior art network of FIG. 1, as enhanced by the improvement of this invention, client 10A sends a get_bytes request for a range of bytes within a file to the file server 10C. File server 10C replies to the get_bytes request with the requested bytes by sending the bytes back to client 10A. A second client 10B requests the same bytes in a conflicting mode, such as client 10B is requesting the bytes for reading while client 10A requested the bytes for writing, or vice versa. In this case, the server must revoke these bytes that the server has just sent to client 10A. The server 10C accomplishes this by sending a revokes_bytes request to client 10A.

Figure 5:
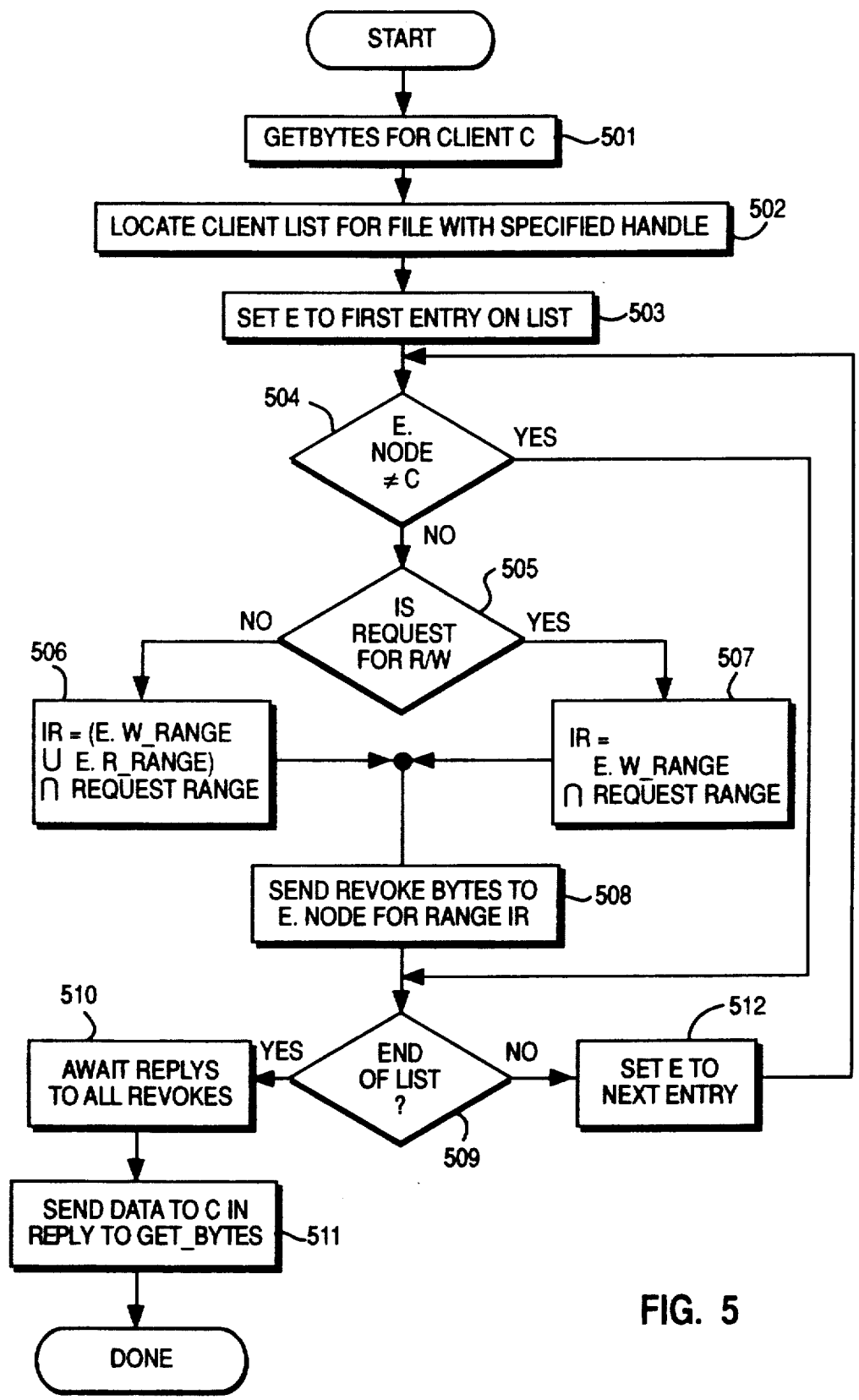
FIG. 5 chart which shows the operation of the get_bytes request processing of this invention at the server.

Referring now to FIG. 5, the operation of the get_bytes request processing at the server is described. At 501, upon receiving a get_bytes request from Client C, the server proceeds at 502 to locate the corresponding client list for the file identified by the file handle specified in the get_bytes request. Setting a variable E to the first entry on this client list, step 503, the server examines the node for this entry E, step 504, and if it is different than the requesting node, proceeds to step 505 where a read/write flag of the entry on the list is examined. If this flag is read only, processing continues at step 507 where the intersecting range is determined. This intersecting range is found at 507 by determining the overlap between the requested range specified by the offset and length in the get_bytes message with the range specified for writing found in the entry. If at 505, the rewrite flag for the entry is found to not be read only, that is, it is found to be read/write, processing continues at step 506 where the intersecting range is determined by finding the overlap between the requested range and both the write range and read ranges for the entry E. At 508 the server then sends a revoke_bytes message to the node specified in the entry for the just determined intersecting range. If, at 509, it is determined that the end of the client list has not been reached, the variable E is set to the next entry on the client list at 512 and processing returns to step 504 where the processing for that entry continues.

If the end of the list has been reached at 509, processing continues at 510 as the server awaits the replies to all revokes that have been issued due to this get_bytes request. At 511 the get_bytes reply is sent back to the requesting client. It contains the requested data, and processing is complete.

The following programming design language listing is another form of the description of the above get_bytes request processing at the server. This listing parallels the operation described above for FIG. 5.

```
/* get_bytes processing at server */
variables
    c: client requesting bytes;
    e: an entry on the client list;
    fh: file handle for requested file;
    req_range: requested range of bytes;
    req_mode: requested mode, ReadOnly or Read/Write;
receive get_bytes( c, fh, req_range, req_rmode );
find client list for file with file handle fh;
FOR e = first entry on client list
    TO last entry on client list DO
    IF e's node not equal to c THEN
        IF req_mode equals ReadOnly THEN
            IF any of e's r/w bytes
                are in req_range THEN
                send revoke bytes to
                    e's node, for
                        overlapping range;
            ENDIF;
        ELSE
            /* req_mode is read/write */
            IF any of e's r/w bytes or
                ReadOnly bytes are in
                req_range THEN
                send revoke_bytes to
                    e's node, for
                        overlapping ranges;
ENDFOR;
await replies for all revokes;
send get_bytes reply, with requested data to
    client;
```

Figure 6:
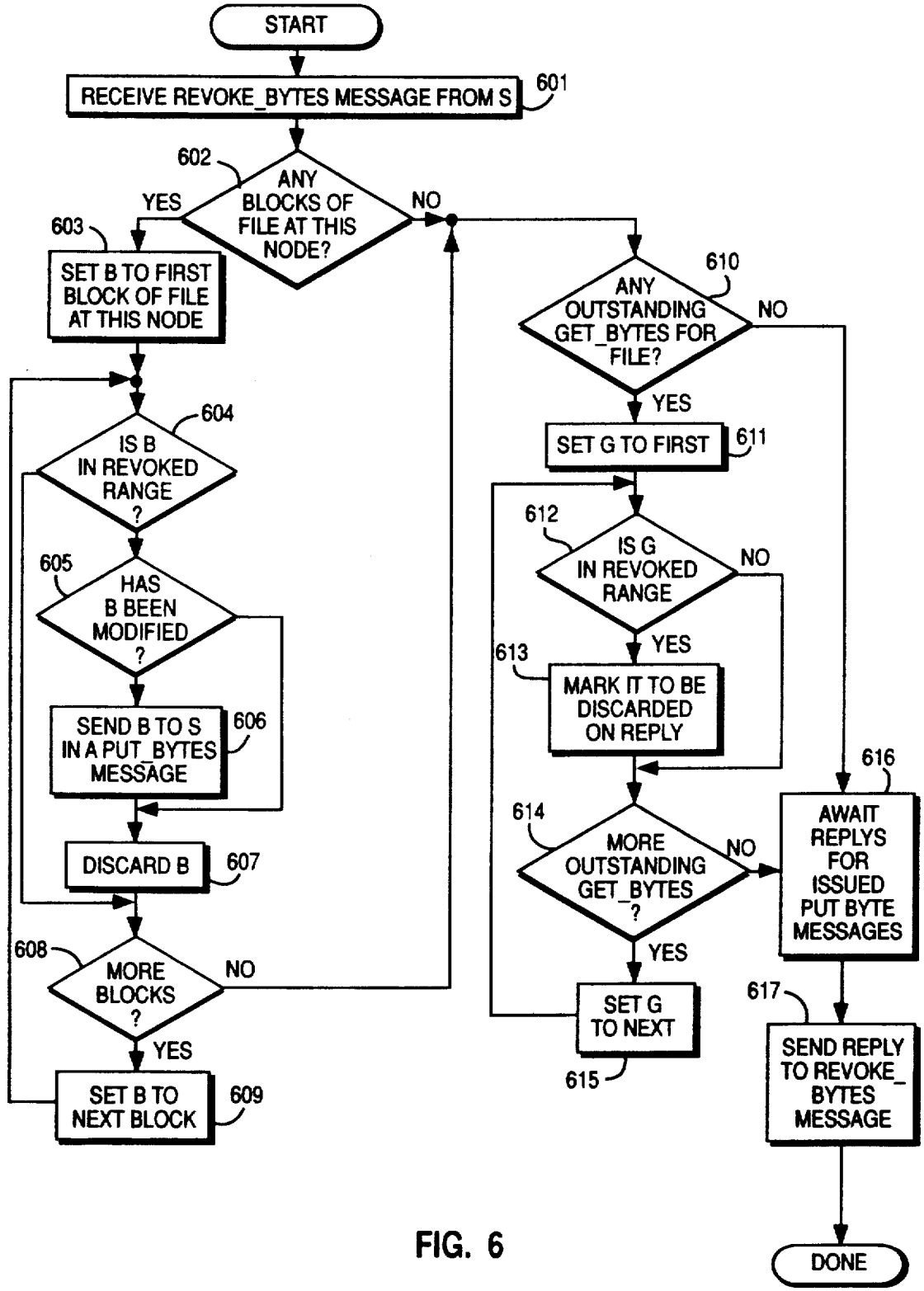
FIG. 6 is a flow chart which shows the operation of the revoke_bytes message of this invention at the client node.

Referring now to FIG. 6, the operation of the revoke_bytes message at the client node is described. At 601 a revoke_bytes message is received from server S. This revoke_bytes message is for a range of blocks of a file. If any blocks for that file are located at this client node, as determined in step 602, a variable B is set to the first block of the file at this client node, step 603. If, at 604, this block is determined to be in the range to be revoked and has also been modified, as determined in step 605, processing continues at 606 where the block is sent to the server S in a put_bytes message. If, in step 605, it is determined that the block has not been modified, then no message is sent to the server for this block. In either case, processing continues at step 607 where the block is discarded. If there are more blocks for this file, as determined in step 608, the variable B is set to the next block and processing continues back at step 604 for this next block.

If, at 608, it is determined that there are no more blocks for this file at this client node, processing continues at step 610 where any outstanding get_bytes requests for this file are examined. If there are outstanding get_bytes requests for this file, a variable G is set to the first of these in step 611. At 612 the variable G is examined to determine if it is for a range of blocks that intersects the revoked range. If so, at 613 the get_bytes request is marked so that its reply will be discarded when it arrives. If there are additional outstanding get_bytes requests for this file as determined in step 614, the variable G is set to the next one of these in step 615 and processing continues back to step 612. If there are no more outstanding get_bytes requests as determined in step 614 or if it was determined that there were no outstanding get_bytes request for the file in step 610, processing continues at 616 where the replies for all previously issued put_bytes messages caused by this revoke_bytes message are awaited. Finally, a reply to the revoke_bytes message is sent to the server at step 617 and processing is complete for the revoke operation.

The following programming design language listing is another form of the description of the above operation of the revoke_bytes message at the client node. This listing parallels the operation described above for FIG. 6.

```
/* revoke_bytes processing on a client node */
variables:
    fh: a file handle, identifying the file;
    range: the range to be revoked;
    b: a block of a file at this node;
    g: a get_bytes request;
procedure:
receive revoke_bytes(fh, range) from server s;
/* revoke data blocks already at this node */
FOR b = first block at this node of file with handle fh
        TO last block of the file at this node DO
    IF b intersects range THEN
        IF b has been modified THEN
            send put_bytes( b ) to the server;
        ENDIF;
        purge b from cache at this node;
    ENDIF;
ENDFOR;
/* revoke outstanding get_bytes requests for file */
FOR g = first outstanding get_bytes request TO
        last outstanding get_ytes DO
    IF g is a get_bytes for file with handle fh
    AND g intersects range THEN
        mark g so that its reply will be discarded;
    ENDIF;
ENDFOR;
wait for replies to the put_bytes messages;
send reply for revoke_bytes message to s;
```

In order to insure that read and write system calls on a file are performed in a serializable fashion throughout a distributed environment, each machine at which a read is being performed must acquire a read token and each machine at which a write is being performed must acquire a read/write token only from the server for the file. If any machine has a read/write token, no machine is allowed to have a read token. Any number of machines may have a read token at the same time. The server coordinates the distribution of these tokens by revoking all read tokens whenever a write token is requested and revoking the write token whenever any read token is requested. The operations shown in FIGS. 8-11 illustrate this process.

Figure 7:
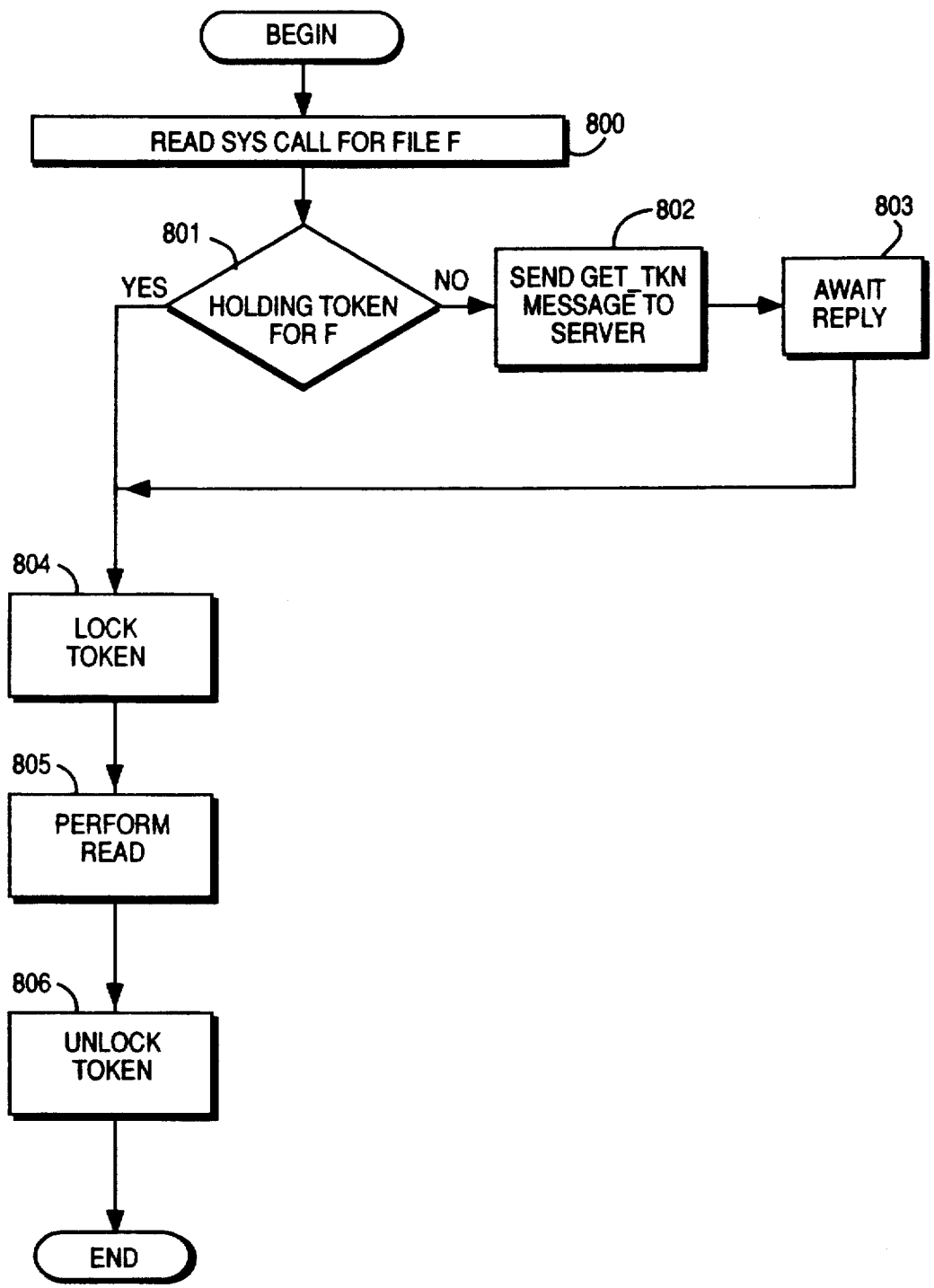
FIG. 7 is a flow chart which shows the operation of the read system call at a client.

FIG. 7 is a flow chart which shows the operation of a read system call performed at a client. At 800, a read system call for a file F is begun. At 801 a test is performed to determine if the token for that file is held at the client machine. This token may be either the read token or the read/write token. If the token is not held currently at the client, at 802 a get_token message is sent to the server. This get_token message requests a read token for the file. The client waits for the reply at 803 and then proceeds to lock the token at 804. This operation prevents the token from being revoked until it is unlocked, thereby maintaining the token at the client for the entire duration of the read operation performed in step 805. After the read operation has been performed, at 806 the token is unlocked, which then makes the token available to be revoked in response to a revoke_token message from the server, but doesn't cause the token to leave this node.

The following programming design language listing is another form of the description of the above operation of a read system call performed at a client. This listing parallels the operation described above for FIG. 7.

```
/* token processing for read at a client */
/* read system call for file f */
IF not holding token for f at this node THEN
    send get_tkn message to f's server
        specifying that a read token is desired;
    await reply;
ENDIF;
/* token is now at this client */
increment lock count on token;
/* tokens with non-zero lock counts cause revoke_tkn*/
/* messages to wait until the lock count goes to 0 */
perform read operation;
unlock token;
```

Figure 8:
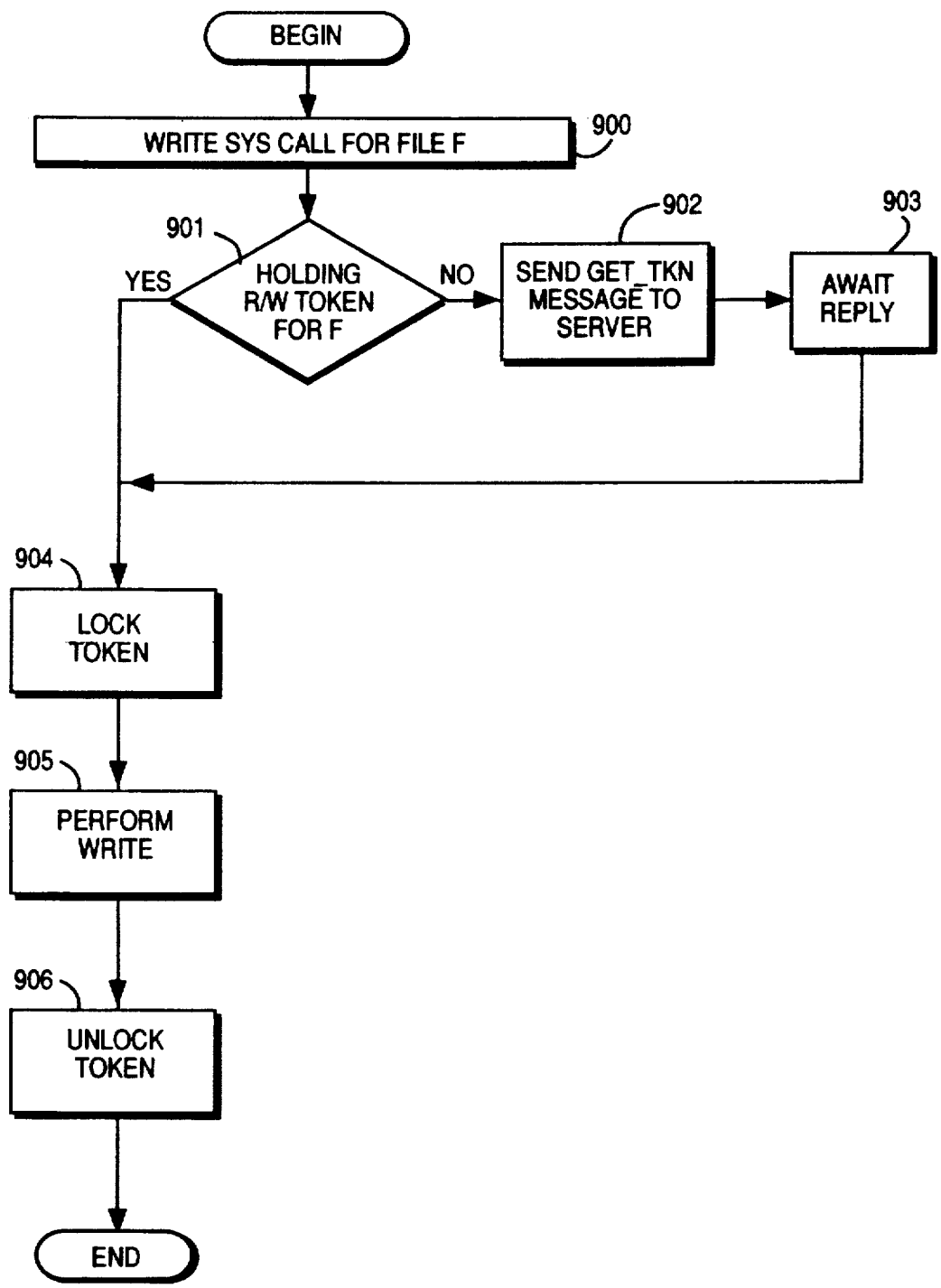
FIG. 8 is a flow chart which shows the operation of the write system call at a client.

FIG. 8 is a flow chart which shows the operation of a write system call at a client. Processing begins at 900 where a write system call for file F is to be executed. A test is performed at 901 to determine if a read/write token for file F is currently at the client system. If it is not, at 902 a get_token message is sent to the server requesting a read/write token for this file. At 903 the client awaits the reply for this get_token message. Once it arrives the client has been granted a read/write token and processing continues at 904 where the token is locked in order to keep it from being revoked from this client during the write operation which is performed in step 905. After the completion of the write operation, the token is unlocked at 906, making it available to be revoked in response to a revoke_token message.

The following programming design language listing is another form of the description of the above operation of a write system call at a client. This listing parallels the operation described above for FIG. 8.

```
/* token processing for write at a client */
* write system call for file f */
IF not holding write token for f at this node THEN
    send get_tkn message to f's server
        specifying that a write token is desired;
    await reply;
ENDIF;
/* write token is now at this client */
increment lock count on token;
/* tokens with non-zero lock counts cause revoke_tkn*/
/* messages to wait until the lock count goes to 0 */
perform write operation;
unlock token;
```

Figure 9:
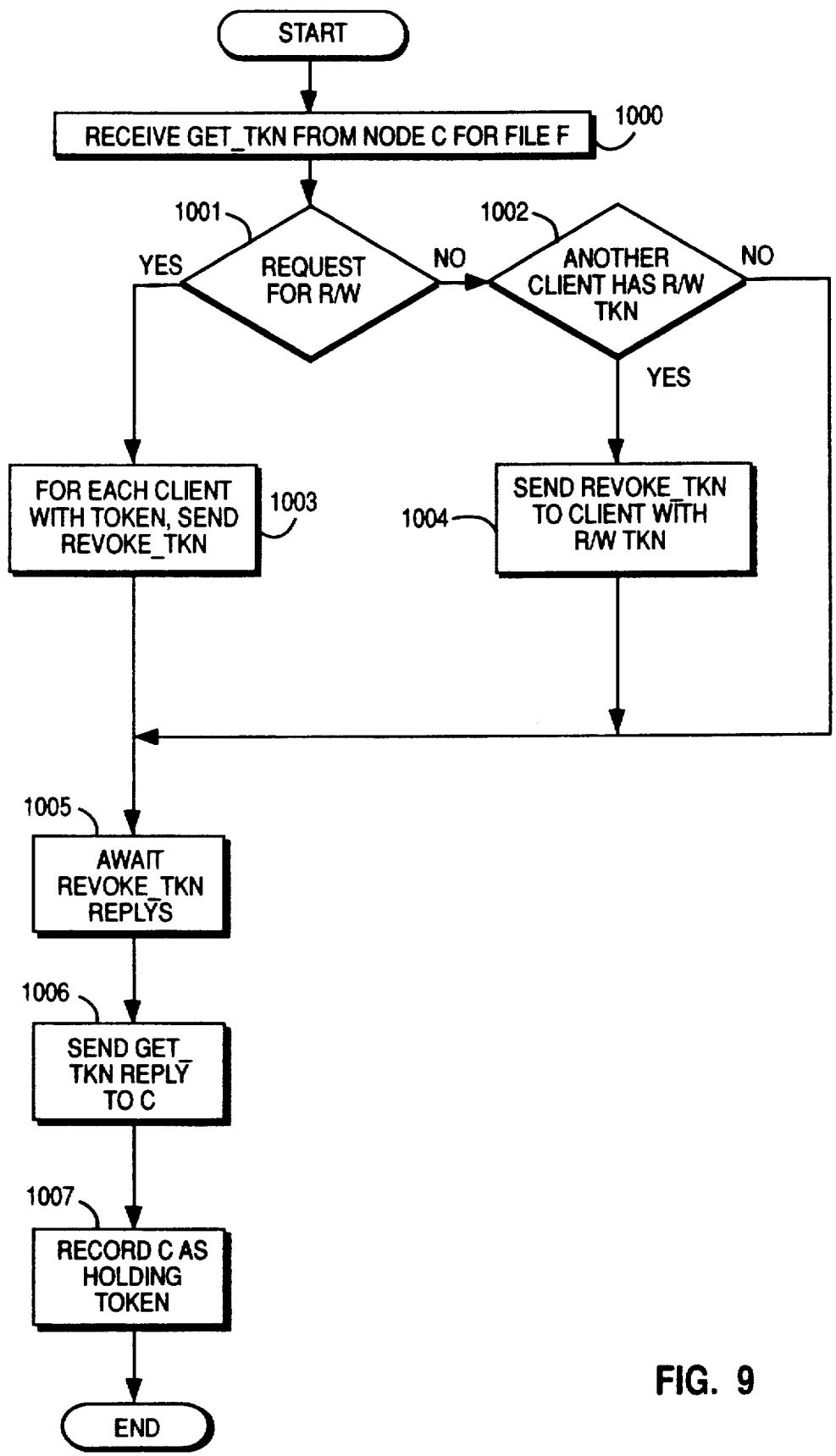
FIG. 9 is a flow chart which shows the operation of the get_token at a the server.

FIG. 9 is a flow chart which shows the operation of the get_token request by the server. At 1000 the server receives a get_token request from node C for file F. If at 1001 this request is for a read/write token, the operation proceeds to 1003 where for each client currently holding a token a revoke_token message is sent. This revoke_token message is sent to only those nodes that the server has previously sent a token to and, additionally, excludes the node C from which the get_token request has been received. If at 1001 it is determined that the request is not for a read/write token, then the request is assumed to be for a read token, and processing continues at 1002 at which time the server determines if another client has the read/write token. If so, at 1004 a revoke_token message is sent to this client. Processing continues at 1005 wherein the server awaits the replies to all revoked token messages that have been issued due to this get_token request. At 1006 the reply to the get_token request is sent back to client C and, finally, at 1007 a record is made that C is holding a either a read/write token for the file or a read token for the file, depending upon the original request.

The following programming design language listing is another form of the description of the above operation of the get_token request by the server. This listing parallels the operation described above for FIG. 9.

```
/* get_tkn processing at server node */
variabes:
    fh: file handle identifying a file;
    mode: ReadOnly or ReadWrite;
procedure:
    receive get_tkn(fh. mode) request from client c;
    IF mode is ReadWrite THEN
        FOR each client on client list for file f DO
            IF the client has been sent a token THEN
                send revoke_tkn to the client;
            ENDIF;
        ENDFOR;
    ELSE
        IF a client has the f's ReadWrite token THEN
            send revoke_tkn to the client;
        ENDIF;
    ENDIF;
    await revoke_tkn replies;
    send get_tkn reply to client c;
    record c as a holder of the token with requested mode;
```

Figure 10:
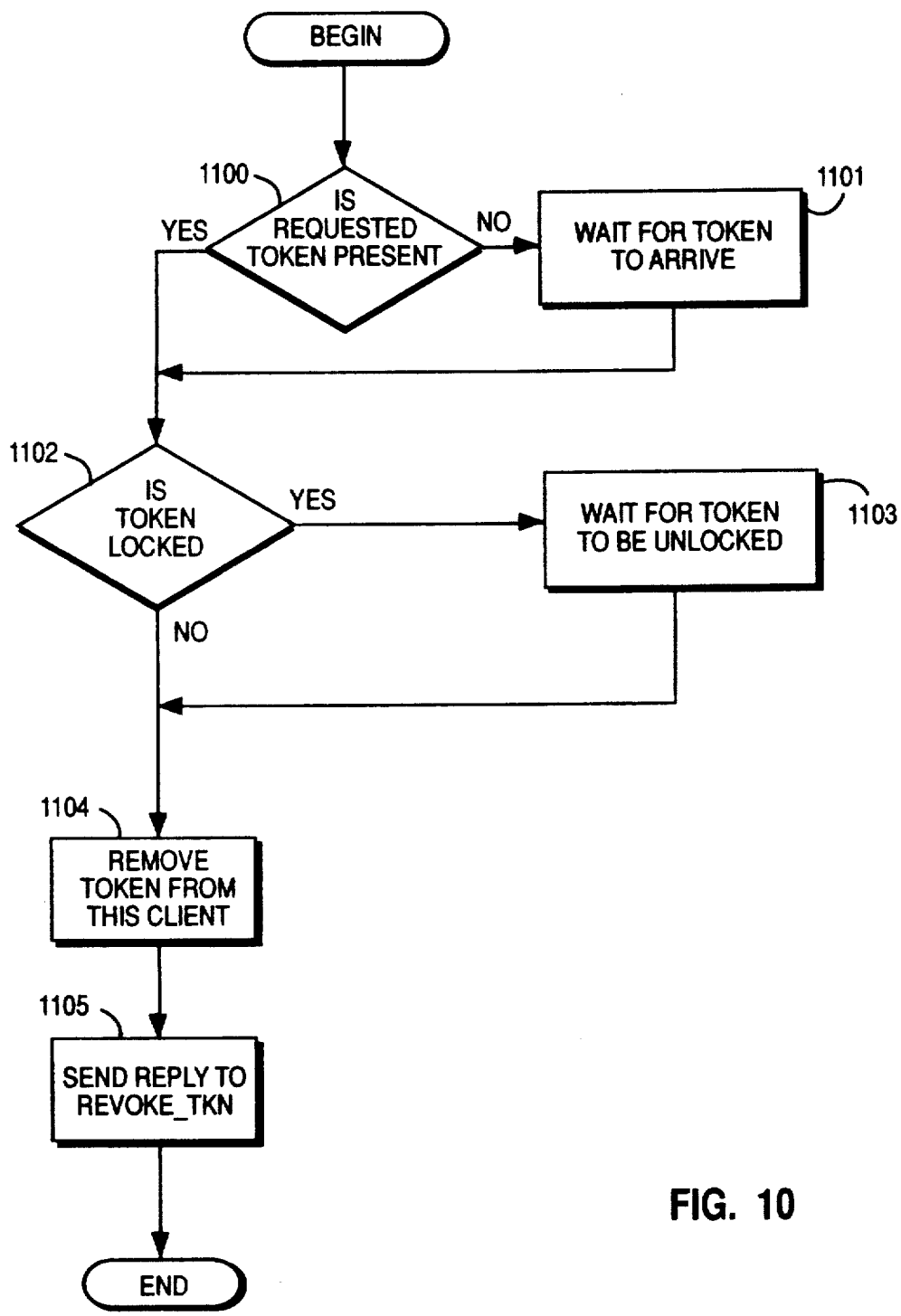
FIG. 10 is a flow chart which shows the operation of the revoke_token processing at a client in response to a revoke_token request.

FIG. 10 is a flow chart which shows the operation of the revoke_token processing at a client that occurs in response to a revoke_token request. At 1100 a test is performed to determine if the token being revoked is present at the client. If not, at 1101 the client waits for the token to arrive before proceeding further. At 1102 the token is examined to see if it is currently locked. If it is, at 1103 the client waits for the token to be unlocked. At 1104, the client has now determined that the token is present and that it is unlocked. At 1105, therefore, the token is removed from this client and a reply is sent to the original revoke_token request.

The following programming design language listing is another form of the description of the above operation of the revoke_token processing at a client that occurs in response to a revoke_token request. This listing parallels the operation described above for FIG. 10.

```
/* revoke_tkn processing at the client */
variables:
    fh: file handle identifying a file;
procedure:
    receive revoke_tkn(fh) request from server s;
    IF not holding token for fh THEN
        wait for token to arrive;
    ENDIF;
    IF lock count on token greater than zero THEN
        wait for lock count to go to zero;
    ENDIF;
    delete token;
    send reply to revoke_tkn request to server;
```

Figure 4A:
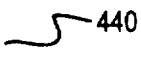
FIG. 4a data structure of a get_bytes message for requesting data bytes from a file.
Figure 4A:
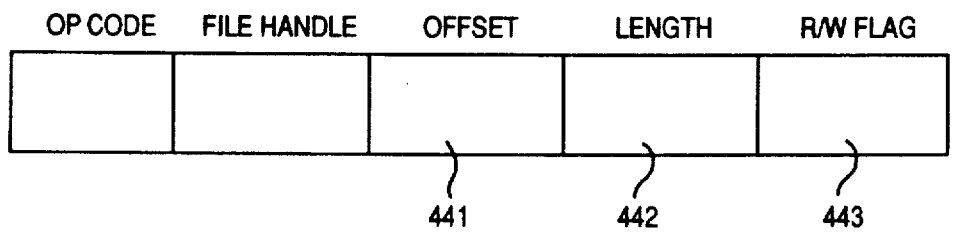

FIG. 4a shows the get_bytes message 440 which requests data bytes from a file. The offset 441 is the offset in the file that marks the beginning of the data that is requested. The length 442 is the number of requested bytes. The read/write flag 443 is used to indicated that the client is requesting a read only copy of the data or a writable copy of the data. The server will only perform the get_bytes operation if the client node has previously opened, and not yet closed the file in a compatible mode. If the rw_flag 443 is read only, then the client must have the file open for reading. If the rw_flag 443 is read/write, then the client must have the file open for writing. In the reply of the get_bytes message 440, data 447 is the actual data requested.

Figure 4B:
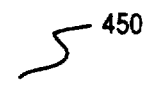
FIG. 4b is a data structure of a get_tkn message for requesting permission to read or read and write to the file.
Figure 4B:
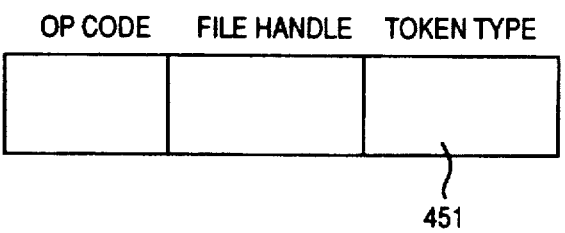
Figure 4B:
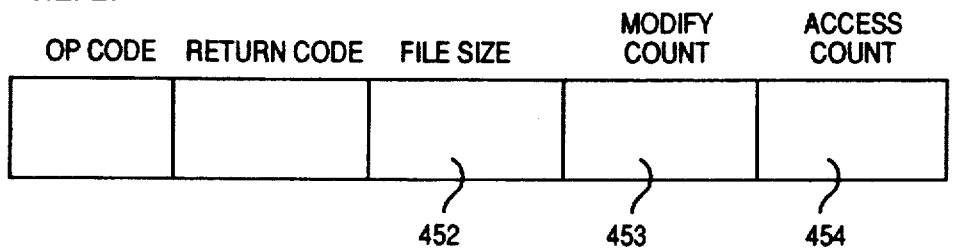

FIG. 4b shows the get_tkn message 450 used by a client to request a token from the server. Token_type 451 specifies which kind of token is requested. The server will only perform the get_tkn operation if the client node has previously opened, and not yet closed, the file in a compatible mode. The file size 452 is the size of the file. Modify count 453 is a value maintained by the server reflecting modifications of a file. The access count 454 is a value maintained by the server reflecting accesses to the file.

Figure 4C:
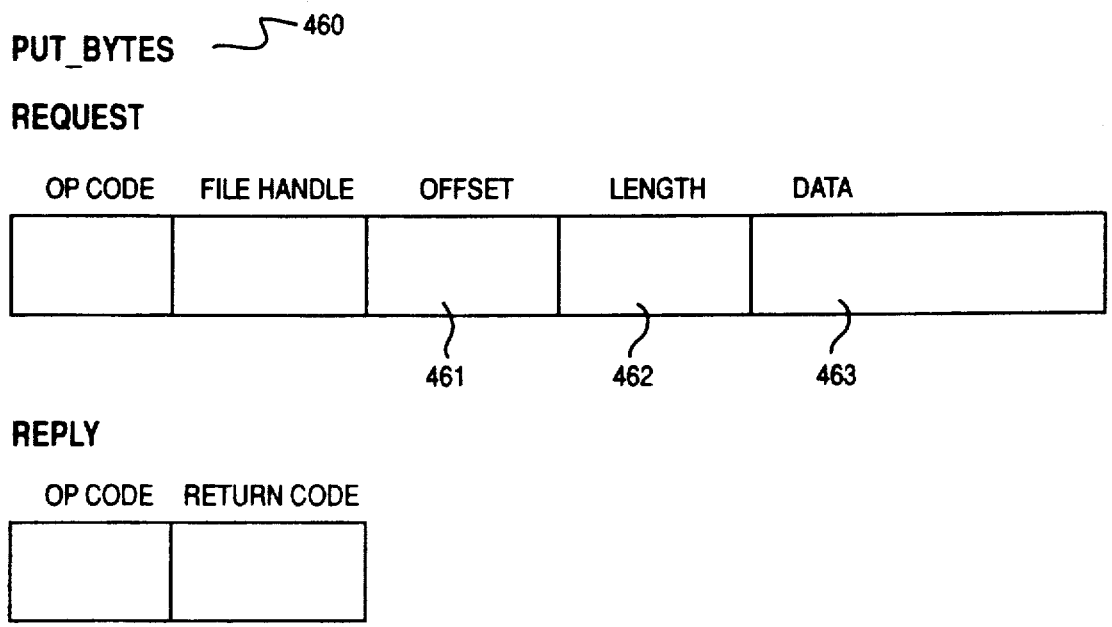
FIG. 4c a data structure of the put_bytes message for sending modified bytes back to the server data processing system from the client data processing system.

FIG. 4c shows the put_bytes message 460. The client returns modified data to the server with the put_bytes message 460. The server will only perform the put_bytes operation if the client has previously opened, and not yet closed, the file for writing. Offset 461 is the offset within the file where the data bytes 463 of length 462 should be placed.

Figure 4D:
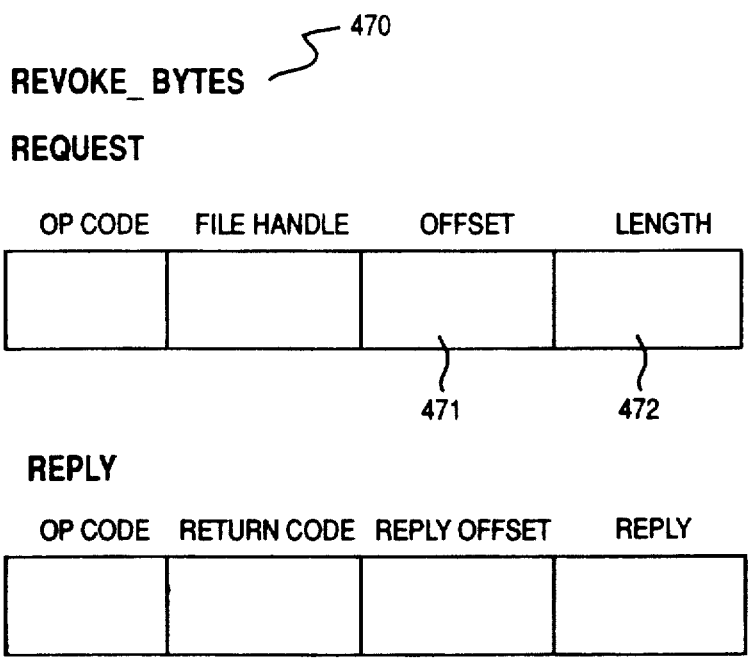
FIG. 4d is a data structure of the revoke_bytes message for revoking the bytes previously sent in the reply to a get_bytes message.

FIG. 4d shows the revoke_bytes message 470. This message is sent from a file's server to a client to revoke the bytes previously given to the client in the reply to a get_bytes message 440. The client does not send the reply until, for the byte range indicated by offset 471 and length 472, it has discarded all unmodified cached data and has written all modified data to the server and received replies. When the client sends the reply, it must have no cached data for the revoked byte range. Any data within the revoked byte range returned by get_bytes requests which were outstanding when a revoke_bytes is processed must be discarded when they arrive.

Figure 4E:
FIG. 4e is a data structure for the revoke_tkn message for revoking the token granting a permission to read the file or for revoking the token granting a permission to read and write to the file.
Figure 4E:
Figure 4E:

FIG. 4e shows the revoke_tkn message 480. This message is sent from a server to a client to revoke the token that the client received in reply to the get_token 450 message. The residual_token_type 481 specifies which kind of token the client is to be left with. Allowed conditions are: a) the client retains a read only token, b) the client retains a read/write token, or c) the client does not retain any token. The file size 482 is the size of the file as viewed by the client after any data modification. In order to avoid confusion between the server and client about the state of the system, the following rule must be followed. Processing of revoke_tkn 480 for a file at a client is delayed until the reply to any outstanding get_tkn 450 for that file has been processed.

In summary, a system and method have been shown in which client access to data at a server is synchronized to keep the data consistent. The server node does this by ensuring that at any given time, each portion of the data accessible for modification at a node is not accessible for reading or modification by any other node while allowing portions of the data accessible only for reading to be accessible by any number of nodes. To enforce these requirements, the server must revoke data that has been previously distributed to a client, if a conflicting request arises from a different client.

Blocks of data are moved or managed on the basis of "get_bytes", "put_bytes" and "revoke_bytes" requests. To ensure correct operation of revoking bytes without causing a deadlock situation, the processing of a revoke_bytes request at a client does not wait for the outstanding get_bytes request to complete. Instead, all outstanding get_bytes are marked so that the bytes that are being requested to be revoked will be discarded when they do arrive at the client.

In order to insure that read and write system calls on a file are performed in a serializable fashion throughout a distributed environment, each machine at which a read is being performed must acquire a read token and each machine at which a write is being performed must acquire a read/write token only from the server for the file. If any machine has a read/write token, no machine is allowed to have a read token. Any number of machines may have a read token at the same time. The server coordinates the distribution of these tokens by revoking all read tokens whenever a write token is requested and revoking the write token whenever any read token is requested.

While the invention has been shown and described with reference to particular embodiments thereof, it will be understood by those skilled in the art that the foregoing and other changes in form and details may be made therein without departing from the spirit and scope of the invention.

We claim:

1. A method for controlling client machine access to a variable length portion of a file stored at a server machine of a data processing system said variable length portion access defined by specifying specific units of data, said method comprising:

allowing transfer of said portion of said file to a plurality of client machines while each of said plurality of client machines has read-only access to said portion of said file by said server's issuing a read-only token to each one of said plurality of client machines having access to said portion of said file and requiring that said read-only tokens are at each of said plurality of client machines during a read operation; and allowing transfer of said portion of said file to only a single client machine while said client machine has read/write access to said portion of said file by said server's issuing a read/write token to said only a single client machine in response to a request by said single client machine for a read/write token and requiring that said read/write token is at said single client machine during a write operation.

2. The method of claim 1 further comprising revoking each of said read-only tokens in response to said request by said single client machine for said read/write token.

3. The method of claim 1 further comprising revoking said read/write token in response to a request by one of said plurality of client machines for either another read/write token or another read-only token.

4. The method of claim 1 further comprising revoking said portion of said file from said one of said plurality of client machines upon receipt by said server of a request for said portion of said file for read/write access by any other of said plurality of client machines.

5. The method of claim 4 wherein said step of revoking said portion of said file from said one of said plurality of client machines further comprises causing said client machine to discard said portion of said file.

6. The method of claim 1 further comprising revoking said portion of said file from said single client machine upon receipt by said server of a request for said portion of said file for either read/write or read-only access by any other client machine.

7. The method of claim 6 wherein said step of revoking said portion of said file from said single client machine further comprises causing said single client machine to send back to said server a first part of said portion of said file that has been changed by said single client machine and to discard a second part of said portion of said file which has not been changed.

8. The method of claim 7 wherein said portion of file is a range of bytes of data in said file.

9. A system for controlling client machine access to a variable length portion of a file stored at a server machine of a data processing system said variable length portion access defined by specifying specific units of data, said system comprising:

first means for allowing transfer of said portion of said file to a plurality of client machines while each of said plurality of client machines has read-only access to said portion of said file, said first means including means for issuing, by said server, a read-only token to each one of said plurality of client machines having read-only access to said portion of said file and for requiring that said read-only tokens are at said each of said plurality of client machines during a read operation; and second means connected to, and responsive to, said first means for allowing transfer of said portion of said file to only a single client machine while said client machine has read/write access to said portion of said file, said second means including means for issuing, by said server, a read/write token to said only a single client machine in response to a request by said single client machine for a read/write token and for requiring that said read/write token is at said single client machine during a write operation.

10. The system of claim 9 further comprising means connected to said first and second means for revoking each of said read-only tokens in response to said request by said single client machine for said read/write token.

11. The system of claim 9 further comprising means connected to said first and second means for revoking said read/write token in response to a request by one of said plurality of client machines for either another read/write token or another read-only token.

12. The system of claim 9 further comprising means connected to said second means for revoking said portion of said file from said one of said plurality of client machines upon receipt by said server of a request for said portion of said file for read/write access by any other of said plurality of client machines.

13. The system of claim 12 wherein means for revoking said portion of said file from said one of said plurality of client machines further comprises means for causing said client machine to discard said portion of said file.

14. The system of claim 9 further comprising means connected to said first and second means for revoking said portion of said file from said single client machine upon receipt by said server of a request for said portion of said file for either read/write or read-only access by any other client machine.

15. The system of claim 14 wherein said means for revoking said portion of said file from said single client machine further comprises means for causing said single client machine to send back to said server a first part of said portion of said file that has been changed by said single client machine and for causing said single client machine to discard a second part of said portion of said file which has not been changed.

* * * * *

UNITED STATES PATENT AND TRADEMARK OFFICE
CERTIFICATE OF CORRECTION

PATENT NO. : 5,175,851

DATED : Dec. 29, 1992

INVENTOR(S) : Donavon W. Johnson, Stephen P. Morgan and Todd A. Smith

It is certified that error appears in the above-identified patent and that said Letters Patent is hereby corrected as shown below:

In the Abstract, line 10, please delete "revokes_bytes" and substitute therefore --revoke_bytes--;

Col. 4, line 60, after "N1", please insert --,--;

Col. 6, line 38, after "4a", please insert --is a--;

line 43, after "4c", please insert --is--;

line 53, after "mission to", please insert --read the file or for revoking the token granting a permission to--;

line 54, after "5", please insert --is a flow--;

line 64, after "get_token", please insert --request--;

Col. 7, line 5, please delete "environment" and substitute therefore --environment 1--;

line 37, please delete "revoke_bytes" and substitute therefore --revoke bytes--;

Col. 10, in the table between lines 15 and 20, please delete the line reading "send revoke bytes to" and substitute therefore --send revoke_bytes to--;

UNITED STATES PATENT AND TRADEMARK OFFICE
CERTIFICATE OF CORRECTION

PATENT NO. : 5,175,851
DATED     : December 29, 1992
INVENTOR(S) : Donavon W. Johnson, et al.

It is certified that error appears in the above-indentified patent and that said Letters Patent is hereby corrected as shown below:

Col. 11, in the table between lines 25 and 30, please delete the line reading "last outstanding get ytes D0" and substitute therefore --last outstanding get_bytes D0--;

Signed and Sealed this

Eighteenth Day of April, 1995

Attest:

BRUCE LEHMAN

Attesting Officer

Commissioner of Patents and Trademarks